US011525587B2

(12) United States Patent
Glueck et al.

(10) Patent No.: US 11,525,587 B2
(45) Date of Patent: Dec. 13, 2022

(54) HUMIDIFIER

(71) Applicant: REINZ-DICHTUNGS-GMBH, Neu-Ulm (DE)

(72) Inventors: Rainer Glueck, Dornstadt (DE); Andre Speidel, Orsenhausen (DE)

(73) Assignee: REINZ-DICHTUNGS-GMBH, Neu-Ulm (DE)

(*) Notice: Subject to any disclaimer, the term of this patent is extended or adjusted under 35 U.S.C. 154(b) by 524 days.

(21) Appl. No.: 16/334,552

(22) PCT Filed: Sep. 22, 2017

(86) PCT No.: PCT/EP2017/074118
§ 371 (c)(1),
(2) Date: Mar. 19, 2019

(87) PCT Pub. No.: WO2018/055129
PCT Pub. Date: Mar. 29, 2018

(65) Prior Publication Data
US 2021/0190339 A1 Jun. 24, 2021

(30) Foreign Application Priority Data
Sep. 23, 2016 (DE) .................... 20 2016 105 309.9

(51) Int. Cl.
F24F 6/04 (2006.01)
F24F 13/08 (2006.01)
H01M 8/04119 (2016.01)

(52) U.S. Cl.
CPC ............... F24F 6/04 (2013.01); F24F 13/08 (2013.01); H01M 8/04149 (2013.01)

(58) Field of Classification Search
CPC ......... F24F 6/04; F24F 13/08; H01M 8/04149
(Continued)

(56) References Cited

U.S. PATENT DOCUMENTS 3,323,653 A 6/1967 Lacey
4,110,220 A * 8/1978 Lavender ............. B01D 63/082
210/321.75
(Continued)

FOREIGN PATENT DOCUMENTS

CN 103392097 A 11/2013
CN 103874537 A 6/2014
(Continued)

OTHER PUBLICATIONS

China National Intellectual Property Administration, Office Action and Search Report Issued in Application No. 201780072451.8, dated Feb. 2, 2021, 16 pages. (Submitted with Partial Translation).
(Continued)

Primary Examiner — Charles S Bushey
(74) Attorney, Agent, or Firm — McCoy Russell LLP

(57) ABSTRACT

A humidifier having a multiplicity of metallic flow plates and a multiplicity of water transfer membranes, in particular for humidifying process gas for an electrochemical system or for HVAC applications is described. The humidifier has a construction in which the metallic flow plates and the water transfer membranes are arranged such that in each case at most one of the single-layer flow plates is arranged between adjacent water transfer membranes of the stack; and at least one of the water transfer membranes is in each case accommodated in a sealing manner, in particular clamped in a sealing manner, between the mutually facing sealing lines of adjacent flow plates of the stack. The humidifier has lower production costs, greater efficiency and lower weight.

23 Claims, 9 Drawing Sheets

(58) Field of Classification Search
USPC .............. 261/100, 101, 102, 104, 105, 107
See application file for complete search history.

(56) References Cited

U.S. PATENT DOCUMENTS

| | | | |
|---|---|---|---|
| 6,220,497 B1 | 4/2001 | Benz | |
| 7,258,329 B2* | 8/2007 | Sasamoto | H01M 8/02 261/107 |
| 7,585,355 B2* | 9/2009 | Gonjo | F28F 3/083 62/304 |
| 8,051,992 B2* | 11/2011 | Skala | B01D 69/12 210/500.36 |
| 8,919,746 B2* | 12/2014 | Vanderwees | H01M 8/04141 261/104 |
| 9,140,471 B2* | 9/2015 | Kozubal | F25B 15/00 |
| 10,845,068 B2* | 11/2020 | Mullen | F28F 21/061 |
| 2005/0233040 A1 | 10/2005 | Ehrfeld | |
| 2010/0326914 A1 | 12/2010 | Drost | |
| 2014/0183763 A1* | 7/2014 | Koo | H01M 8/0258 261/112.2 |
| 2015/0162627 A1* | 6/2015 | Fasold | H01M 8/04149 261/101 |
| 2015/0171442 A1* | 6/2015 | Fasold | B01D 69/10 261/102 |
| 2015/0180059 A1 | 6/2015 | Vanderwees | |
| 2015/0314241 A1 | 11/2015 | Hester | |

FOREIGN PATENT DOCUMENTS

| | | |
|---|---|---|
| CN | 104584300 A | 4/2015 |
| CN | 104955552 A | 9/2015 |
| DE | 3127475 | 4/1982 |
| DE | 102013208877 | 11/2013 |
| DE | 202013003566 U1 | 7/2014 |
| DE | 102013004799 | 9/2014 |
| DE | 102014100659 | 7/2015 |
| DE | 202014006480 | 11/2015 |
| WO | 2013022945 | 2/2013 |
| WO | 2014033052 | 3/2014 |
| WO | 2016020550 | 2/2016 |

OTHER PUBLICATIONS

European Patent Office, International Search Report and written opinion issued in application PCT/EP2017/074119, dated Nov. 28, 2017, 16 pages.

European Patent Office, International Search Report with Written Opinion issued in PCT/EP2017/074126, dated Nov. 28, 2017, 27 pages, European Patent Office, Rijswijk, Netherlands.

European Patent Office, International Search Report and Written Opinion in Application PCT/EP2017/074118, dated Nov. 16, 2017, 14 pages.

* cited by examiner

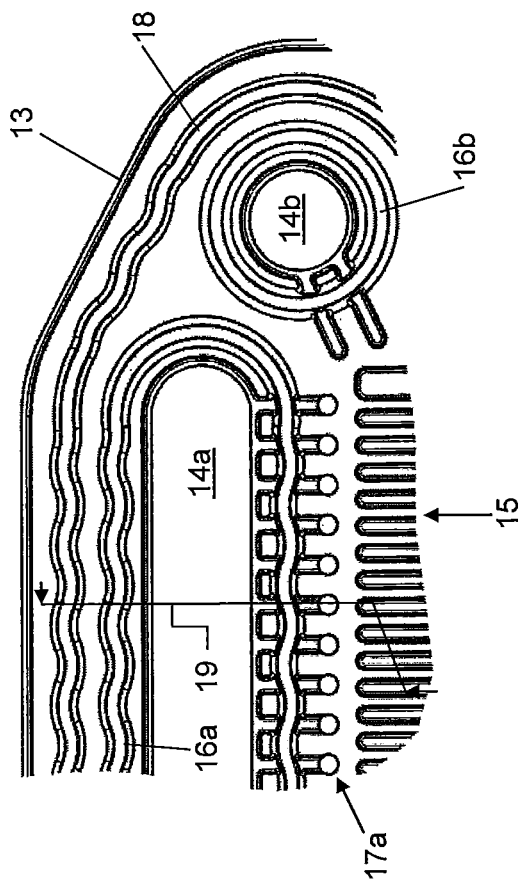
Fig. 2-a (Prior Art)
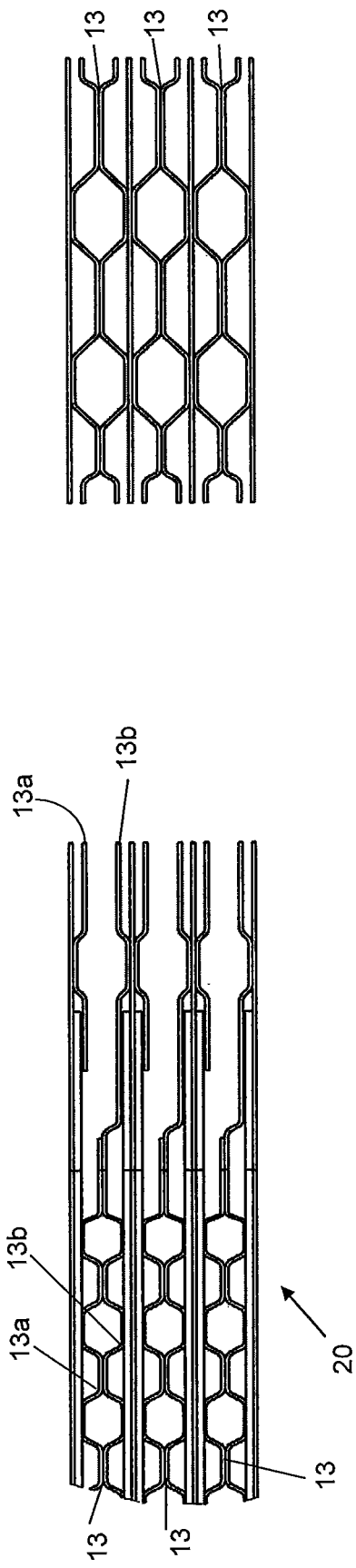
Fig. 2-b (Prior Art)

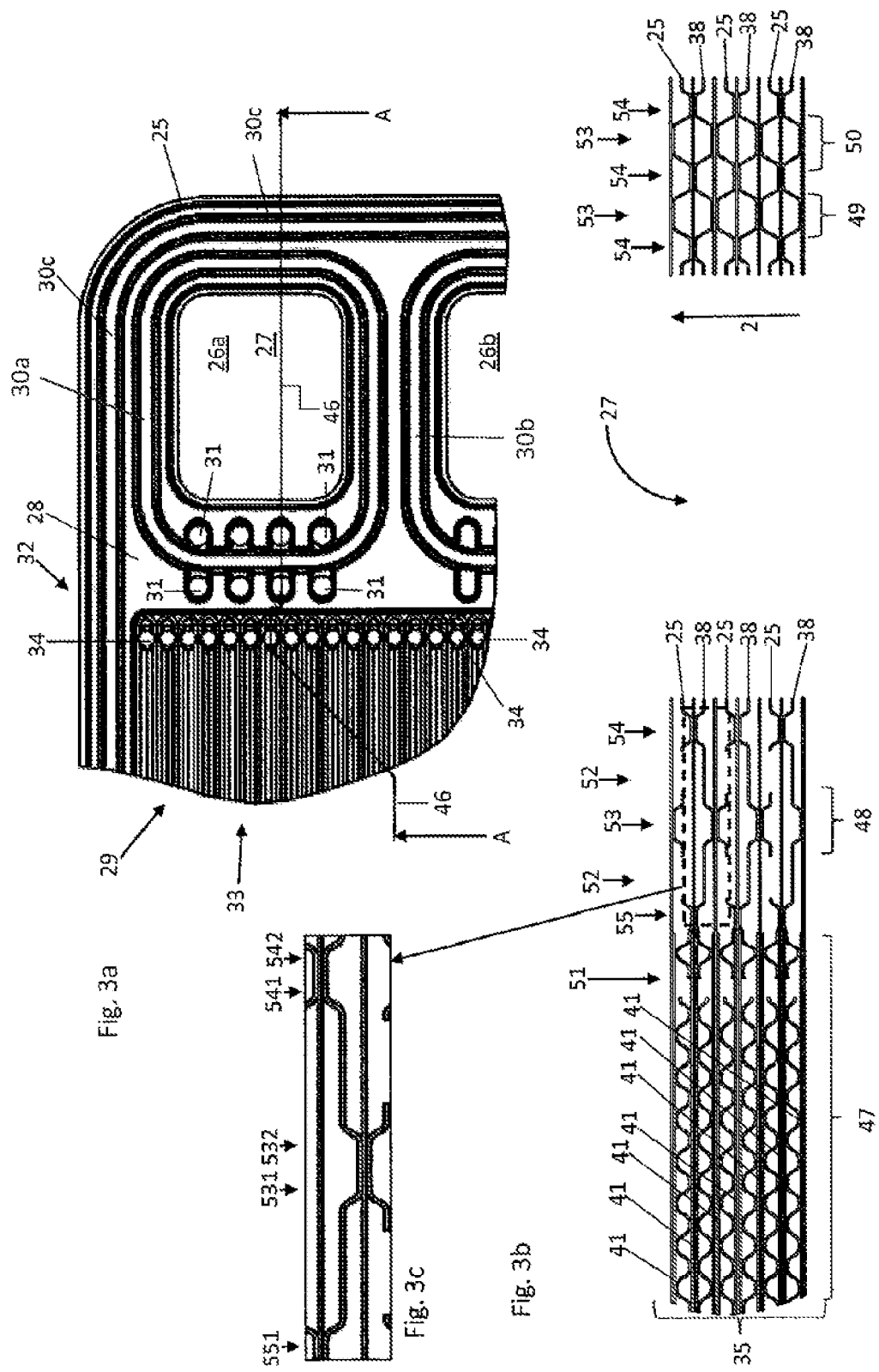

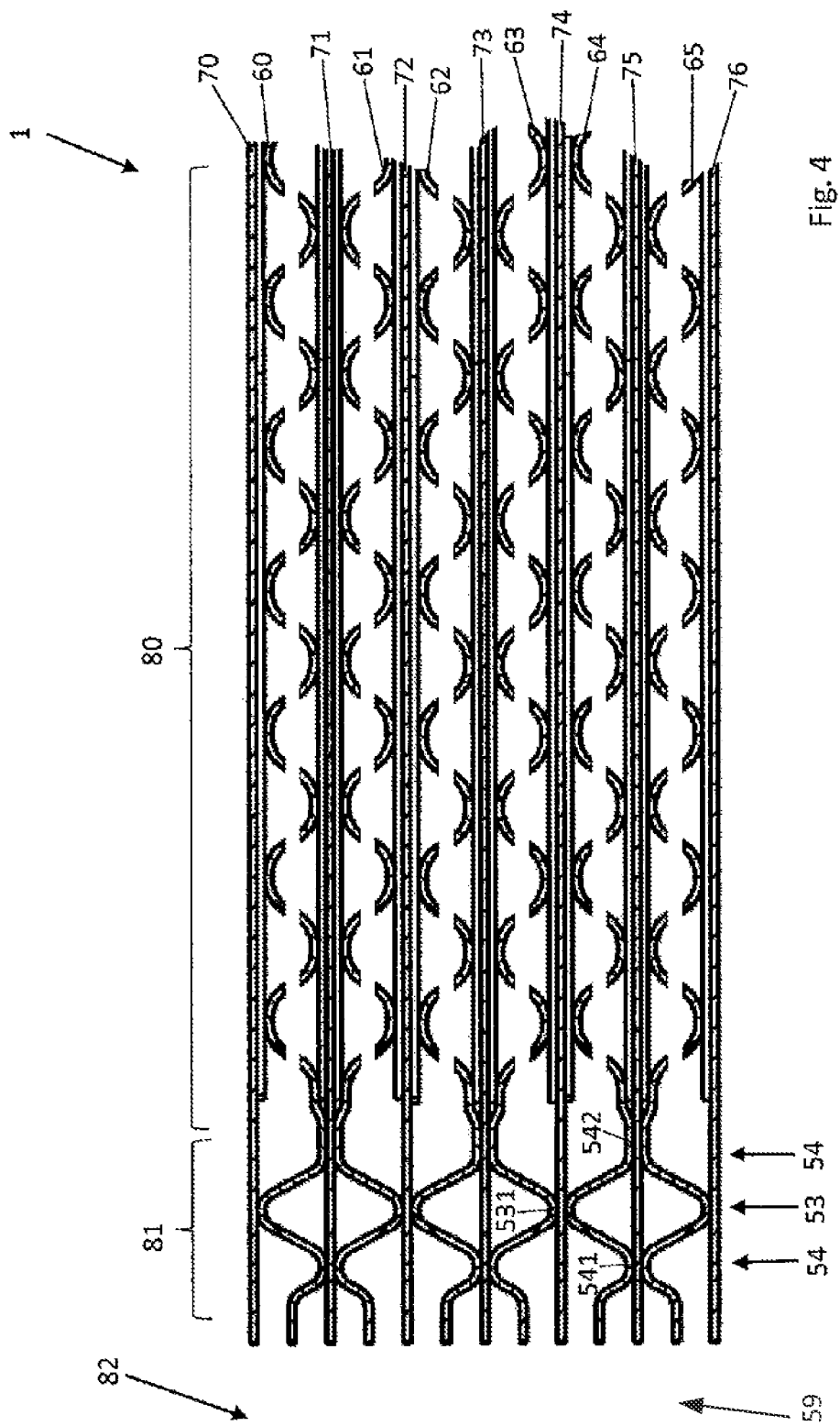

HUMIDIFIER

BACKGROUND

The invention relates to a humidifier which comprises a stack with a plurality of flow plates and with a plurality of water transfer membranes. In particular, such humidifiers are suitable for humidifying process gas for electrochemical systems. Concerning the mentioned electrochemical systems, these for example can be fuel cell systems, electrochemical compressors, electrolysers or the like. Apart from applications in the field of electrochemical systems, humidifiers can also be applied for processing air in the field of building technology and air management in vehicles, i.e. in a field which is grouped together under the term "heating, ventilation and air conditioning" (HVAC).

DE102013208877A1 describes a humidifier, in particular for the humidification of process gas of fuel cells, which comprises a multitude of stacked, doubled-layered flow plates and water transfer membranes which are arranged between the flow plates. The humidifier according to DE102013208877A1 further comprises sealing structures with a sealing bead and openings which are arranged in the sealing bead and which create a fluid connection between the port openings of the plate and a flow field which is arranged on the plate surface. These sealing structures are comparatively simple and inexpensive to manufacture and further ensure an efficient and reliable operation of the humidifier. A perspective representation of two adjacent flow plates and a water transfer membrane which is arranged between these two adjacent flow plates is represented in DE102013208877A1, e.g. in FIG. 3a.

SUMMARY

Starting from the state of the art according to DE102013208877A1, it is the object of the invention to reduce the costs for the manufacture and operation of the humidifier even further and to yet further improve its efficiency.

What is suggested then is a humidifier, in particular for humidifying process gas for an electrochemical system or for HVAC applications, which comprises a stack with a multitude of flow plates and with a multitude of water transfer membranes. The flow plates are each formed of precisely one layer of a metal sheet, wherein at least one sealing bead, which is formed as one part with the metal sheet and which forms at least one sealing line on the flat sides of the metal sheet which lie opposite one another, is formed into the metal sheet. The flow plates and the water transfer membranes are arranged in a manner such that at the most one of the single-layered flow plates is arranged between adjacent water transfer membranes of the stack. Furthermore, the sealing beads of the flow plates are designed in a manner such that at least one of the water transfer membranes is sealingly received, in particular sealingly pressed, between the sealing lines which face one another, of adjacent flow plates of the stack. The flow plates are therefore preferably arranged and designed in a manner such that adjacent flow plates support one another along their sealing lines which face one another.

Due to the fact that the flow plates are each formed of precisely one layer of a metal sheet and that the flow plates and the water transfer membranes are arranged in a manner such that at the most one of the single-layered flow plates is arranged between adjacent water transfer membranes of the stack, the number of metal layers which is necessary for manufacturing the humidifier with a given number of humidifier cells can be significantly reduced compared to the humidifier which is described in DE102013208877A1. On the one hand this considerably reduces the manufacturing costs. On the other hand, this greatly increases the efficiency of the humidifier, since the humidifier is designed in a more lightweight and compact manner and because the share of the volume of the humidifier cells with respect to the total volume of the humidifier is decisively increased when compared to the humidifier according to DE102013208877A1. This improvement of the humidifier is made possible due to, amongst other things, the fact that the sealing beads of the single-layered flow plates are designed in a manner such that at least one of the water transfer membranes is sealingly received, in particular sealingly pressed, between the sealing lines which face one another, of adjacent flow plates of the stack.

Compared to plastic flow plates, the metal flow plates which are suggested here can not only be manufactured more economically, but can also considerably more quickly and with greater precision. Furthermore, mechanical stresses in the flow plate stack during operation of the humidifier are reduced as a result of the lower thermal expansion of metal in comparison to plastic, by which means the service life of the humidifier is extended.

The humidifier usually comprises two end plates, between which the flow plate stack is arranged or clamped, two stack termination plates which are arranged between the end plates and which terminate the stack to the end plates, and a stack interior which comprises the flow plates which are arranged between the stack termination plates. At least two of the flow plates of the stack interior, preferably each second one of the flow plates of the stack interior, can be constructed identically to one another. The stack interior therefore preferably comprises at the most two types of flow plates of a different construction type. Particularly preferably, all flow plates of the stack interior are constructed identically to one another. In this manner, the manufacture of the humidifier is further simplified and the manufacturing costs further reduced.

The first and the second flat side of the metal sheets of the structurally identical flow plates of the stack interior are usually each designed differently. In particular, the structurally identical flow plates of the stack interior are arranged and aligned in a manner such that adjacent, structurally identical flow plates of the stack interior face one another with their first flat sides and with their second flat sides in an alternating manner. If the stack interior e.g. only comprises flow plates which are structurally identical to one another, this includes the flow plates of the stack being stacked and aligned in a manner such that with their first flat side they face the first end plate and the second end plate of the humidifier in an alternating manner.

The flow plates can each be designed in a manner such that the same sealing bead on a first flat side of the metal sheet forms a first sealing line and on a second flat side of the metal sheet forms a second sealing line, wherein a perpendicular projection of the first sealing line into a projection plane which is aligned parallel to the planar surface plane of the respective flow plate and a perpendicular projection of the second sealing line into the same projection plane run in a manner such that the projection of the first sealing line encompasses the projection of the second sealing line or that the projection of the second sealing line encompasses the projection of the first sealing line. In particular, this design of the sealing bead or the sealing beads of the flow plates which permits a sealing received or pressing of at least one water transfer membrane on each flat side of the flow plate permits the only single-layered design of the flow plates with the advantages with regard to the weight, volume, low manufacturing costs and the efficiency of the humidifier which this entails. Herein, the sealing beads are further preferably designed in a manner such that the projections of the first and the second sealing line are distanced to one another in a continuous manner, i.e. along their entire course.

The flow plates, in particular those of the stack interior can each be designed in a manner such that the first sealing line of a given flow plate is sealingly supportable on the first sealing line of a first adjacent plate which is e.g. in structurally identical to this flow plate and is directly adjacent to it in the stack and that the second sealing line is sealingly supportable on the second sealing line of a second adjacent plate which is structurally identical to this flow plate and is directly adjacent to it in the stack, and specifically preferably whist receiving at least one water transfer membrane between the sealing lines of the directly adjacent flow plates. This e.g. can include the flow plates, in particular those in the stack interior, each comprising at least one symmetry axis with a two-fold symmetry. The symmetry axis can be aligned perpendicularly or parallel to the planar surface plane of the flow plate. It is also conceivable for the adjacent flow plates of the stack to be structurally identical to one another only with regard to the course of the sealing lines which are formed by the sealing beads and e.g. differ with regard to the presence or absence of openings in the sealing beads for guiding process gas through the respective sealing bead, in particular with regard to the arrangement of such openings in the respective sealing bead.

The sealing bead or the sealing beads of the flow plates can each comprise a coating along at least one of the sealing lines which are formed by them. This coating is preferably continuous and reaches along the complete sealing line. This can increase the sealing effect of the sealing beads and possibly their elasticity in the stack direction, thus perpendicular to the planar surface plane of the respective flow plate.

The flow plates can each comprise a rectangular shape or an essentially rectangular shape. This can include the corners or at least some of the corners of the flow plate being rounded. Two diagonals of the flow plate which intersect one another at an intersection point can be defined by way of the rectangular or by way of the essentially rectangular shape of the flow plate. The two-fold symmetry axis of the flow plate can then run e.g. through this intersection point.

The flow plates, in particular those of the stack interior, can each comprise a flow field for guiding a gas on at least one of the flat sides of the metal sheet. The gas can be led along the plate surface in a targeted and defined manner in the region of the flow field. The water transfer rate per humidifier cell can thus be increased and the efficiency of the humidifier further increased. The flow field is preferably designed as one piece with the metal sheet. E.g. the flow field can comprise channel structures which are formed into the metal sheet.

The flow plates can each also comprise flow fields on both flat sides of the metal sheet. The efficiency of the humidifier can yet be further increased in this manner. E.g. the flow fields can each comprise channel-like deepenings and webs which separate the channel-like deepenings from one another. These for example can be designed in a manner such that the rear sides of the channel-like deepenings of the flow field on the first flat side of the flow plate form the webs of the flow field on the second flat side of the flow plate or vice versa.

The metal sheet of the flow plate can further comprise through-openings on both flat sides of the flow plate in the region of the flow fields, said through-openings creating a fluid connection between the flow fields on the flat sides of the metal sheet which lie opposite one another. The flow behaviour in the flow fields on the flat sides of the flow plate which lie opposite one another can therefore be influenced e.g. in a defined manner. In particular, one can avoid the water exchange only taking place between the planes which are close to the membrane, Furthermore, these through-openings can be designed in a manner such that a speed component which is aligned perpendicularly to the planar surface pane of the flow plate is impressed upon the gas which switches through the through-openings from the flow field on the first flat side of the flow plate into the flow field on the second flat side of the flow plate or vice versa. This can effect or improve a through-mixing of the gas perpendicularly to the planar surface plane of the flow plate. The water transfer rate can therefore be increased via a water transfer membrane which is adjacent to this flow field or is adjacent to this flow field. For example, the through-openings can be designed in a manner such that a projection of the through-openings into a plane parallel to the planar surface plane each has an area which is different to zero. With this variant, the flow plate does not serve for the separation of different media in the region of the flow fields. In contrast, here it is preferable for the same medium, i.e. gas to be humidified and in the further process humidified gas or humid gas and in the further course gas of a lower humidity content, to flow on both sides of the flow plate. This can also be termed as a monopolar construction. The separation of the gas system here is effected only via the water transfer membranes.

The flow plates can each be designed in a manner such that the flow field and/or the flow fields is/are each encompassed by the mentioned sealing bead or by one of the sealing beads, for sealing off the flow fields and for sealing off the flow field.

Typically, the flow plates are each designed in a manner such that the metal sheet comprises through-openings for guiding a gas through the metal sheet. Usually, the flow plates are stacked and aligned in the humidifier in a manner such that the mentioned through-openings of the flow plates are aligned with one another and thus form conduits which extend through the stack in the stack direction and are each in fluid connection with a gas inlet or gas outlet of the humidifier. This gas outlet or gas inlet is usually arranged on at least one of the end plates of the humidifier. The through-openings can then each be encompassed by the sealing bead or by one of the sealing beads for sealing the through-openings. The sealing beads which encompass the through-openings and/or the flow field can comprise openings which create a fluid connection between the respective through-opening and the flow field. Alternatively, or additionally, the sealing beads which encompass the through-openings, at a side which is away from the respective through-opening can comprise web-like projections for the support of a water transfer membrane or a support medium.

The flow plates can each be designed in a manner such that the sealing bead or the sealing beads comprises/comprise a bead roof and two bead feet which are formed on both sides of the bead roof. The two bead feet can then form two first sealing lines on the first flat side of the metal sheet and the bead roof can then form precisely one second sealing line or at least two second sealing lines on the second flat side of the metal sheet depending on its shape. Advantageously, at least one first sealing line and the second sealing line(s) run along the complete course of the sealing bead such that they form closed sealing lines. In contrast, the second of the first sealing lines can comprise interruptions and preferably serves for supporting the sealing bead.

Another possible embodiment of the sealing bead envisages the sealing bead in cross section having a shape which corresponds e.g. roughly to the course of a lying letter "S" or of a period of a sine curve between two zero-crossings of the sine curve which are arranged at the distance of a period length. The sealing lines on the flat sides of the metal sheet which lie opposite one another then run for example along a maximum or the minimum of the sine curve in the region of this period of the sine curve or in the region of the "bulges" of the lying letter "S". Of course, the sealing bead which is designed in such a manner can also have a in cross section which differs from the mentioned examples (sine period, lying letter "S"). E.g. this sealing bead in cross section can also partially have a straight and/or angled course. For example, it is usually advantageous for the sealing bead designed in such a manner, to in cross-section running sectionally in a straight manner at least in the region of the sealing lines which are formed by it, thus for the sealing lines to each have a width which is different to zero. Their sealing effect can be improved by way of this and the stability of the stack increased. A sealing bead which is designed in such a manner and which forms a closed loop can be designed e.g. in a manner such that projections of its two sealing lines into a projection plane which is aligned parallel to the planar surface plane of the flow plate run as previously described in a manner such that the projection of the first sealing line completely encompasses the projection of the second sealing line or vice versa.

The metal sheet of the flow plates or at least some of the flow plates can be designed from stainless steel. Stainless steel is particularly stable, can be easily machined and is hardly corrosive. Advantageously, a sheet thickness of the metal sheet is at the most 200 µm, at the most 150 µm, at the most 120 µm or at the most 90 µm. Such a thin design of the metal sheets can advantageously contribute to the low manufacturing costs, to the low weight and to the compact construction manner of the humidifier. Furthermore, the flow plate can be completely or at least partly coated, e.g. by way of a hydrophilic or a hydrophobic coating, for microsealing, in particular of the sealing elements or for corrosion protection.

The flow plates can be designed and arranged in a manner such that the through-openings of the flow plates of the stack are arranged in an aligned manner and form conduits which extend through the stack in the stack direction for guiding gas to be humidified, gas to be dehumidified, humidified gas and dehumidified gas. As described beforehand, these conduits are preferably each in fluid connection with a gas connection of the humidifier.

One can envisage two water transfer membranes being arranged between two adjacent flow plates of the stack, said membranes between themselves enclosing a first volume for receiving a gas to be humidified and in the further course for receiving a humidified gas. This first volume is then preferably in fluid connection with a conduit for guiding gas to be humidified gas and with a conduit for guiding humidified gas. Accordingly, the two water transfer membranes which enclose the first volume, with the adjacent flow plates each enclose a second volume for receiving a gas to be dehumidified and in the further course for receiving a dehumidified gas. These second volumes which are arranged on both sides of the first volume are then preferably each in fluid connection with a conduit for guiding gas to be dehumidified and with a conduit for guiding dehumidified gas. On operation of the humidifier, the first volumes are preferably in fluid connection with a compressor which introduces dry gas into the first volumes at a pressure $p_1$, and the second volumes are in fluid connection with a gas outlet e.g. of a fuel cell stack which guides humid gas enriched with water vapour into the second volumes at a second pressure $p_2$, wherein $p_1 > p_2$. The dry gas which is at the higher pressure $p_1$ therefore inflates the first volumes and presses the two water transfer membranes which enclose the first volumes against the adjacent flow plates. The two water transfer membranes which are arranged between two flow plates which are adjacent to one another can also be two sections of a continuous water transfer membrane, in particular one which is folded once.

A preferably annular spacer can be arranged in the region of in particular two conduits, between the water transfer membranes which enclose the first volumes. This spacer is then e.g. designed and arranged in a manner such that it sealingly presses the water transfer membranes which enclose the first volume onto the adjacent flow plates in the region of the conduits. The spacer can comprise recesses and/or openings, which each create a fluid connection between the respective conduit and the first volume.

BRIEF DESCRIPTION OF THE DRAWINGS

Embodiment examples of the humidifier which is put forward here are represented in the figures and are explained in more detail by way of the subsequent description. Here and hereinafter, recurring features are each provided with the same reference numerals. Concerning the subsequent examples, a multitude of optional features is described in combination with one another in the form of an embodiment example. These individual embodiment/design options can also each be applied per se for the configuration of the present invention or also in arbitrary combination, also beyond individual embodiment examples. There are shown in:

FIG. 2a a plan view of a detail of a flow plate according to the state of the art;

FIG. 2b a sectioned representation through a humidifier according to the state of the art;

FIG. 3a a plan view of a detail of a flow plate of a humidifier according to one embodiment of the invention;

FIG. 3b a sectioned representation through a section of a humidifier according to one embodiment of the invention;

FIG. 3c a detailed representation of a humidifier according to one embodiment of the invention;

FIG. 4 a sectioned representation through a section of a humidifier according to a further embodiment of the invention;

FIGS. 9b-d embodiments of an annular spacer of the humidifier according to FIG. 9a.

DETAILED DESCRIPTION

Figure 1A:
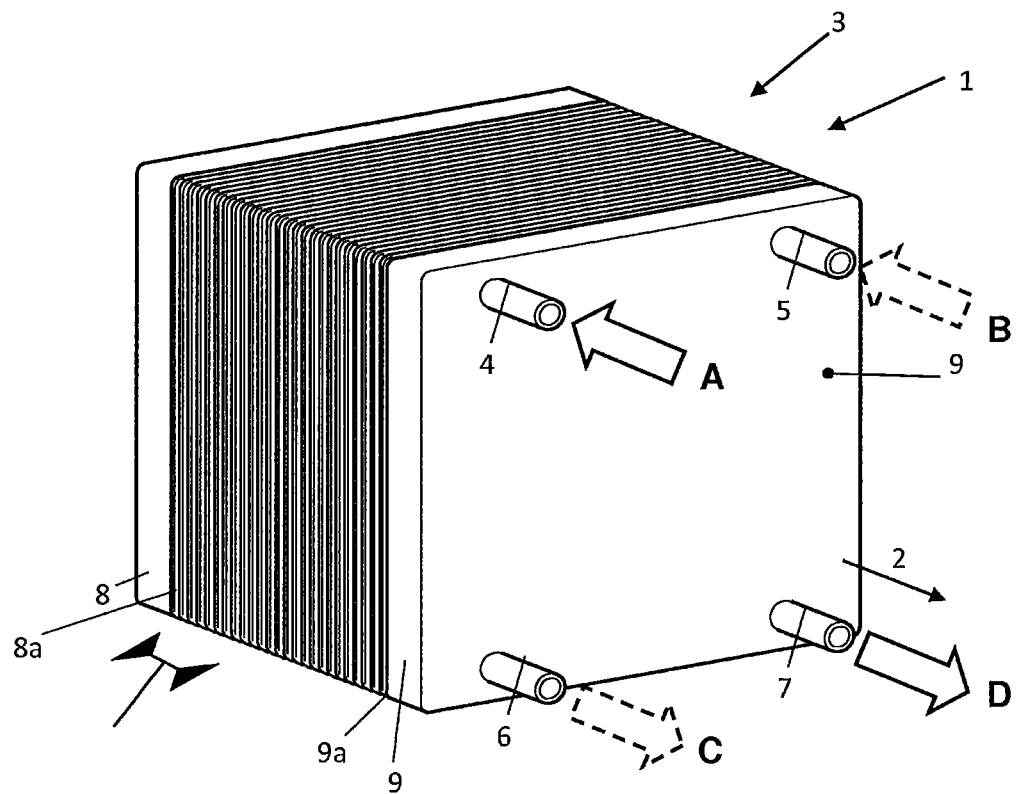
FIG. 1a a humidifier with a multitude of humidifier cells.

FIG. 1a in a perspective representation shows a block-shaped humidifier 1 with humidifier cells 3 which are stacked in the stack direction 2 and which each comprise at least one flow plate and a water transfer membrane, wherein the humidifier cells are connected to one another by way of through-openings which are aligned in the stack direction 2 and which run out into outwardly guiding gas connections 4, 5, 6, 7. The gas connections 4, 5, 6, 7 pass through one of the end plates 8, 9 of the humidifier 1. The gas inlets are herein provided with the reference numerals 4 and 5 and the gas outlets with the represented numerals 6 and 7. The corresponding gas flow directions are indicated at A, B, C, D. Herein, the stack termination plates 8a, 9a which are directly adjacent to the end plates 8, 9, with regard to their design often differ from the remaining flow plates which are arranged in the inside of the humidifier.

Figure 1B:
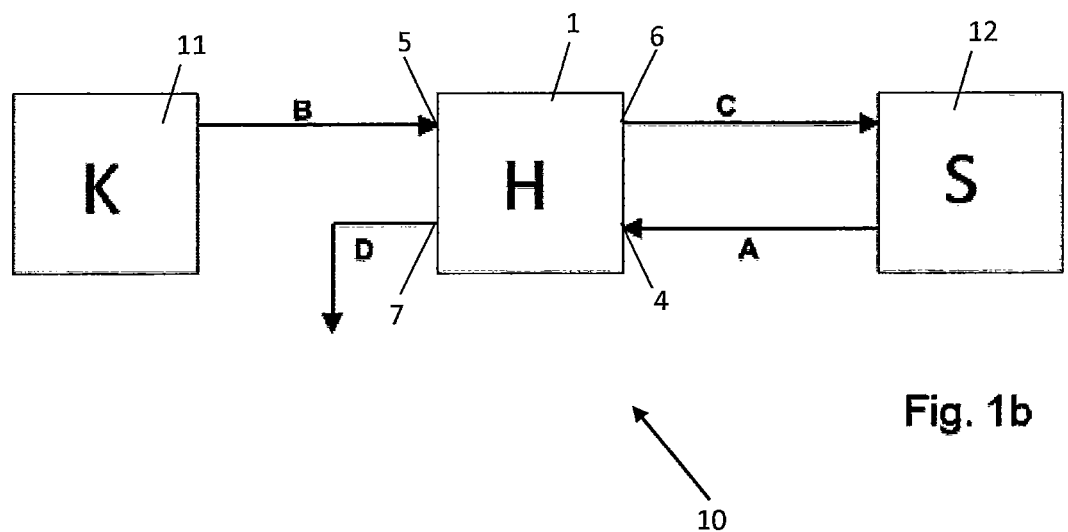
FIG. 1b an electrochemical system with the humidifier according to FIG. 1.

The individual humidifier cells 3 which are stacked in the humidifier 1 each have the same external dimensions, so that a cuboid with flat side surfaces arises on stacking. FIG. 1b schematically shows an electrochemical system 10 with a compressor 11, a humidifier 1 and a fuel cell stack 12 which for example comprises a multitude of hydrogen/oxygen fuel cells. A dry process gas which is to be humidified, e.g. molecular hydrogen or molecular oxygen or air is fed from the compressor 11 to the humidifier 1 via a first inlet 5 of the humidifier 1. The process gas which is humidified in the humidifier 1 is then delivered to the fuel cell stack 12 via a first outlet 6 of the humidifier 1. There, the chemical energy of different process gases is converted into electrical energy by way of a multitude of membrane electrode units. The discharge air with the water which arises with the reaction of the process gases in the fuel cell stack 12 is fed to the humidifier via a second inlet 4 and there serves for humidifying the dry process gas which is fed to the humidifier 1 via the first inlet 5, through the water transfer membrane. The dehumidified gas is delivered for example to the surroundings via a second outlet 7 of the humidifier 1. The capital letters of FIG. 1b correspond to the gas flow directions which are likewise indicated in FIG. 1a and are explained in the text with regard to this, in the context of the gas connections. On account of the fact that the gas which is humidified in the fuel cell stack 12 has undergone a pressure drop in the fuel cell stack 12, the pressure of the humid gas which is fed from the fuel cell stack 12 to the humidifier 1 via the inlet 4 is lower than the pressure of the dry gas which is to say the gas to be humidified, which is fed from the compressor 11 to the humidifier 1 via the inlet 5.

FIG. 2a shows a plan view of a detail of a flow plate 13 which is known from the state of the art and which comprises two layers of a metal sheet. The flow plate 13 comprises through-openings 14a, 14b for guiding media through the flow plate 12 and a flow field 15. The flow field 15 comprises channel-like structures for guiding a gas along a surface of the flow plate 13. Sealing beads 16a, 16b encompass the through-openings 14a, 14b, in order to seal the through-openings 14a, 14b to the outside and to the inside of the flow plate 13. Openings 17a in the sealing bead 16a create a fluid connection between the through-opening 14a and the flow field 15. A further sealing bead 18 encompasses the through-openings 14a, 14b and the flow field 15, in order to seal these to the outside.

FIG. 2b shows a sectioned representation through a stack 20 which comprises flow plates of the type of flow plate 13 of FIG. 2a. The section plane of the sectioned representation of FIG. 2b is aligned perpendicularly to the plane of the drawing of FIG. 2a and runs along the section line 19 which is represented in FIG. 2a. It can be clearly recognised in the sectioned representation of FIG. 2b that the flow plates 13 each comprise two layers 13a, 13b which are each e.g. welded to one another. Water transfer membranes are arranged between the double-layered flow plates 13 of FIG. 2b.

FIG. 3a shows a plan view of a detail of one embodiment of a flow plate 25 according to the invention. The flow plate 25 is one of the flow plates of the humidifier 1 from the FIGS. 1a, 1b. The flow plate 25 has a rectangular shape with rounded corners. In contrast to the known flow plates 13 which are shown in FIG. 2b, the flow plate 25 according to the invention only comprises precisely one layer of the metal sheet. Herein, it can be e.g. a stainless steel sheet. Likewise, the sheet which is used for forming the flow plate 25 can however also be formed from other metals or metal alloys. The metal sheet, from which the flow plate 25 is formed, preferably has a thickness of less than 90 μm.

The flow plate 25 comprises through-openings 26a, 26b for guiding media through the flow plate. For example, the through-opening 26a of the flow plate 25 is aligned with corresponding through-openings of the other flow plates of the humidifier 1 and with these forms a first conduit 27 for guiding gas which is to be humidified (see FIG. 3b). The first conduit 27 extends in the stack direction 2 through the humidifier 1 and can be in fluid connection with the compressor 11 of the electrochemical system 10 e.g. via the gas inlet 5 on the end plate 9 of the humidifier 1. Accordingly, the through-opening 26b of the flow plate 25 with the through-openings of the other flow plates of the humidifier 1 can form a second conduit (not shown) which serves for guiding gas to be dehumidified. The second conduit can then be in fluid connection with the fuel cell stack 12 e.g. via the gas inlet 4 on the end plate 9 of the humidifier 1.

The flow plate 25 comprises a first flow field 29 at the first flat side 28 of this flow plate 25 which is faces the viewer of FIG. 3a. The first flow field 29 comprises first channel structures which are configured to guide gas along the surface of the first flat side 28 of the flow plate 25 in a direction which is defined by the course of the first channel structures. The first channel structures of the first flow field 29 comprise channels and webs which are arranged between the channels and which separate the channels from one another. The first channel structures of the first flow field 29 are designed as one piece with the metal sheet which forms the flow plate 25 and is formed into the metal sheet, e.g. by way of stamping in a stamping tool or by deep drawing. The first channel structures of the first flow field 29, on a second flat side 32 of the flow plate 25 which lies opposite the first flat side 28 and which is away from the viewer of FIG. 3a forms a second flow field 33 with second channel structures, wherein the webs of the first flow field 29 form the channels of the second flow field 33 and vice versa. The second flow field 33 serves for guiding gas along the second flat side 32 of the flow plate 25.

A sealing bead 30a, 30b is arranged around each of the through-openings 26a, 26b for sealing the through-openings 26a, 26b to the outside and to the interior of the humidifier 1. The sealing beads 30a, 30b each encompass the through-openings 26a, 26b in a complete manner. The sealing beads 30a, 30b are each designed as one piece with the metal sheet, from which the flow plate 25 is manufactured. E.g. the sealing beads 30a, 30b are formed into the metal sheet of the flow plate 25 by way of stamping with a stamping tool or by way of deep-drawing.

The sealing bead 30a which encompasses the through-opening 26a, in its flanks comprises openings 31 which create a fluid connection between the through-opening 26a and the flow field 29. Gas can therefore be led via the openings 31 out of the first conduit 27 which is formed by the through-opening 26a, through the ceiling bead 30a into the flow field 29. A further sealing bead 30c runs along an edge of the flow plate 25. The sealing bead 30c completely encompasses the flow fields 29, 33 as well as the through-openings 26a, 26b with the sealing beads 30a, 30b and serves for sealing the flow fields 29, 33 and the through-openings 26, 26 to the outside, i.e. with respect to the surroundings of the humidifier 1.

What is not explicitly shown in the detail according to FIG. 3a is a third through-opening of the flow plate 25 which is likewise in fluid connection with the first flow field 29 and via which gas which is humidified in the region of the flow field 29 can be fed to the fuel cell stack 12 via the gas outlet 6, as well as a fourth through-opening of the flow plate 25 which with corresponding through-openings of the other flow plates of the humidifier 1 forms a conduit for feeding dehumidified gas which can be delivered to the surroundings via the gas outlet 7.

What can further be derived from the representation of FIG. 3a is the fact that the metal sheet of the flow plate 25 in the edge region of the flow fields 29, 33 comprises through-openings 34, of which here only individual ones are provided with reference numerals for a better overview. The through-openings 34 create a fluid connection between the flow fields 29, 33 at the flat sides of the flow plate 25 which lie opposite one another. The through-openings 34 are designed in a manner such that a perpendicular projection of the through-openings 34 into a plane parallel to the planar surface plane of the flow plate 25 each has an area which is different to zero. This design of the through-openings 34 encourages e.g. a through-mixing of the gas which is led along the flat sides 28, 32 of the flow plate 25, perpendicularly to the planar surface plane of the flow plate 25. This can increase the water transfer rate of the humidifier 1 and thereby its efficiency. The planar surface plane of the flow plate 25 in FIG. 3a runs parallel to the plane of the drawing. It is defined for example by the edge of the flow plate 25 or by the non-deformed sections of the metal sheet, from which the flow plate 25 is manufactured.

FIG. 3b shows a sectioned representation through a section 35 in the inside of the humidifier 1, said section reaching over several humidifier cells. The section plane of the sectioned representation of FIG. 3b is aligned perpendicularly to the plane of the drawing of FIG. 3a and runs along the section line 46 (A-A) which is represented in FIG. 3a. The section 35 comprises first flow plates of the type of the flow plate 25, second flow plates 38 and water transfer membranes 41, wherein the first flow plates 25, the second flow plates 38 and the water transfer membranes 41 are arranged in a stacked manner along the stack direction 2. The first flow plates 25 are structurally identical to one another. The second flow plates 38 are also structurally identical to one another. The second flow plates 38 differ from the first flow plates 25 only with regard to the openings in the sealing beads which encompass the through-openings of the flow plates. In particular, those sealing beds of the second flow plates 38 which encompass the first conduit 27, in their flanks comprise no openings of the type of openings 31 of the flow plate 25 of FIG. 3a. The second flow plates 28 are otherwise equal to the first flow plates 25. In particular, therefore, the second flow plates 38 are also each formed from precisely one layer of a metal sheet.

The inside of the stack of the humidifier 1 therefore comprises only two types of flow plates of a different construction type, specifically flow plates of the type of the first flow plates 25 and flow plates of the type of the second flow plates 28. The manufacture of the humidifier 1 is therefore considerably simplified. As can be derived from the representation of FIG. 3b, the first flow plates 25 and the second flow plates 28 are arranged in the humidifier 1 in a manner alternating in the stack direction 2. In the inside of the stack therefore, one of the second flow plates 38 is subsequent to each of the first flow plates 25 in the stack direction and one of the first flow plates 25 is subsequent to each of the second flow plates 38, etc.

One of the water transfer membranes 41 is arranged between two adjacent single-layered flow plates 25, 38 of the humidifier 1. In other words, the flow plates 25, 38 and the water transfer membranes 41 of the humidifier 1 are arranged in a manner such that at the most one (in the embodiment example of FIG. 3b exactly one) of the only single-layered flow plates 25, 38 is arranged between two adjacent water transfer membranes of the stack. In contrast to known humidifiers, concerning which a double-layered flow plate is each arranged between two adjacent water transfer membranes, the arrangement shown in FIG. 3b with only single-layered flow plates evidently has significant advantages with regard to weight, manufacturing costs and efficiency of the humidifier. In particular, with a humidifier with single-layered flow plates, a larger share of the total volume of the humidifier is available for receiving gas which is to be humidified and for receiving gas which is to be dehumidified, compared to humidifiers with double-layered flow plates, by which means the water transfer rate per volume is significantly increased.

In a first part region 47 along the section line 46, the flow plates 25, 38 in FIG. 3b on both flat sides each comprise flow fields which are provided with channel structures as the flow fields 29, 33 of the flow plate 25. Gas diffusion layers (GDL) are each arranged between the water transfer membranes 41 and the adjacent flow plates 25, 38, on both sides of the water transfer membranes 41a in the region of the flow fields. Apart from the improvement of the water transfer rate via the water transfer membranes 41, the GDLs in particular serve for the support of the water transfer membranes 41.

In a second part-region 48 and in a third part-region 49 along the section line 46, these being arranged on both sides of the first conduit 27, the flow plates 25, 38 each comprise a sealing bead which as the sealing bead 30a of the flow plate 25 is arranged around the through-openings which form a first conduit 27, for sealing these through-openings.

In a fourth part-region 50 along the section line 46, the flow plates 25, 38 each comprise a further sealing bead which as the sealing bead 30c of the flow plate 25 runs along the edge for the flow plates 25, 38 and seals the inside of the humidifier 1 with respect to the surroundings of the humidifier 1.

At the position 51 along the section line 46, the flow plates 25, 38 in the region of their flow fields each comprise through-openings which as the through-openings 34 of the flow plate 25 each create a fluid connection between the flow fields on the two flat sides of the respective flow plate which lie opposite one another. A gas space, thus a volume for receiving a certain gas therefore forms through the flow plate 25 (and 38 respectively) from a water transfer membrane 41 to the water transfer membrane 41 which lies closest.

In contrast, as described previously, only each second flow plate of the stack comprises an opening in the respective flanks of the sealing bead at the two positions 52 along the section line 46, said sealing bead being arranged around the first conduit 27 for guiding dry gas or gas to be humidified. It is therefore ensured that only every second of the gas spaces is filled with dry gas via the conduit 27, whereas the gas spaces lying therebetween are filled with humid gas or gas to be dehumidified (not shown in FIG. 3a). A humidity exchange is therefore effected via the water transfer membranes 41 which separate the gas spaces which are adjacent to one another and belong to the humidifier cell, from one another.

The inventive single-layered design of the flow plates 25, 38 amongst other things is rendered possible by way of the same sealing bead which is formed into the metal sheet of the respective flow plate, for example the sealing beads 30a, 30b, 30c of the flow plate 25, forming at least one sealing line on the flat sides of the metal sheet which lie opposite one another, wherein at least one of the water transfer membranes 41 is sealingly pressed between sealing lines which face one another, of adjacent flow plates of the stack. The flow plates 25, 38 of the humidifier 1 are therefore designed and arranged in a manner such that adjacent flow plates are supported on one another along their sealing lines. In FIG. 3b, the positions of the sealing regions of the flow plates 25, 38 along the section line 46 are characterised at 53, 54 and 55.

For example, in FIG. 3b, the sealing beads of the flow plates 25, 38 in the part region 49 along the section line 46 are designed such that each of the sealing beads of the flow plates 25, 38 in the part-region 49 comprises a planar sealing roof and two bead feet which connect onto the bead flanks. Herein, the bead roof and the bead feet each run parallel to the planar surface pane of the flow plate. FIG. 3c shows that two first sealing lines 531, 532 are herein each formed on the ends of the sealing roof on a first flat side of the metal sheet of the respective flow plate, and two second sealing lines 541, 542 are herein formed by the two bead feet on the second flat side of the metal sheet which lies opposite the first flat side. A single sealing line 551 results with the half-bead in the region 55. Thereby, a part of the sealing lines which are formed by the same sealing bead are each continuously distanced parallel to the planar surface plane of the respective flow plate on flat sides of the metal sheet which lie opposite one another. In FIG. 3b, the sealing lines of the flow plates 25, 38 each run perpendicularly to the drawing plane, specifically along the course of the beads 30a, 30c, in the sealing regions 53, 54.

FIG. 4 shows a sectioned view of a section in the inside of the humidifier 1 according to a further embodiment. Again what is represented is a detail of a stack with flow plates 60-65 which are each formed from an only single-layered metal sheet, and with water transfer membranes 70-76. The flow plates 60-65 and the water transfer membranes 70-76 are stacked in an alternating manner, so that precisely one of the single-layered flow plates 60-65 is arranged between two adjacent water transfer membranes as in FIG. 3a. In a first part-region 80, the flow plates 60-65 each comprise a flow field with channel structures which are formed into the metal sheet of the respective flow plate. In contrast to the example of the figure group 3, here the flow plates in their flanks comprise through-openings, of which only one is explicitly characterised by the reference numeral 59. The multitude of through-openings 59 permits an even better homogenisation of the gas flow on both side of the flow plate than the through-openings 34 at the edge of the flow fields, the latter through-openings being shown in FIG. 3a. Gas diffusion layers are arranged on both sides of the water transfer membranes 70-76 in the region of the flow fields, wherein of the two gas diffusion layers on the water transfer membranes 70-76 only one is visible in each case. A sealing bead is formed into the metal plate of the respective flow plate in a second part-region 81 of the flow plates 60-65. The sealing beads in the second part region 81 serve for sealing a conduit 82 which is formed by through openings which are aligned to one another in the flow plates 60-65, with respect to the flow fields in the first part region 80.

As in FIG. 3b, the sealing beads of the flow plates 60-65 in the second part-region 81 in FIG. 4 are each designed such that a first sealing region 53 on a first flat side of each of the flow plates 60-65 is given by the round bead roof, wherein here on account of the rounded bead roof between two flow plates it always forms precisely one first sealing line 531, and two second sealing regions 54 on a second flat side which lies opposite the first flat side are given by the bead feet which each connect to the bead flanks at both sides of the bead roof. The sealing regions 54 of the bead feet here likewise both form precisely one sealing line, specifically the second sealing lines 541 and 542. For example, the sealing roofs of the flow plates 61, 62 face one another and are supported on one another, wherein the water transfer membrane 72 is received and pressed between the bead roofs of the flow plates 61, 62.

Likewise, the bead feet of the flow plates 62, 63 face one another and support themselves on one another, wherein the water transfer membrane 73 is received and pressed between the bead feet of the flow plates 62, 63.

In contrast to FIG. 3b, all flow plates 60-65 in FIG. 4 are designed in a structurally identical manner. In particular, all flow plates in the inside of the stack of the humidifier 1 according to FIG. 4 can be designed structurally identically. The costs and duration of the manufacture of the humidifier can therefore be reduced yet further, since only one stamping tool is necessary. For example, structurally identical flow plates 60-65 can each comprise at least one symmetry axis with an at least two-fold symmetry. In contrast to the flow plates 25, 38 according to FIG. 3b, the flow plates 60-65 according to FIG. 4 further comprise no through-openings in the region of the flow fields in the first part-region 80 (see position 51 in FIG. 3b).

It is not difficult to recognise that the two flat sides of the flow plates 60-65 which are each structurally identical to one another are each designed differently in FIG. 4. For example, in FIG. 4 the first flat sides of the flow plates 60, 62, 64 face upwards, whereas the first flat sides of the flow plates 61, 63, 65 face downwards. In FIG. 4 therefore, adjacent structurally identical flow plates face one another with their first flat sides and second flat sides in an alternating manner. For example, the flow plates 61, 62 face one another with their first flat sides, and the flow plates 62, 63 face one another with their second flat sides.

Figure 5:
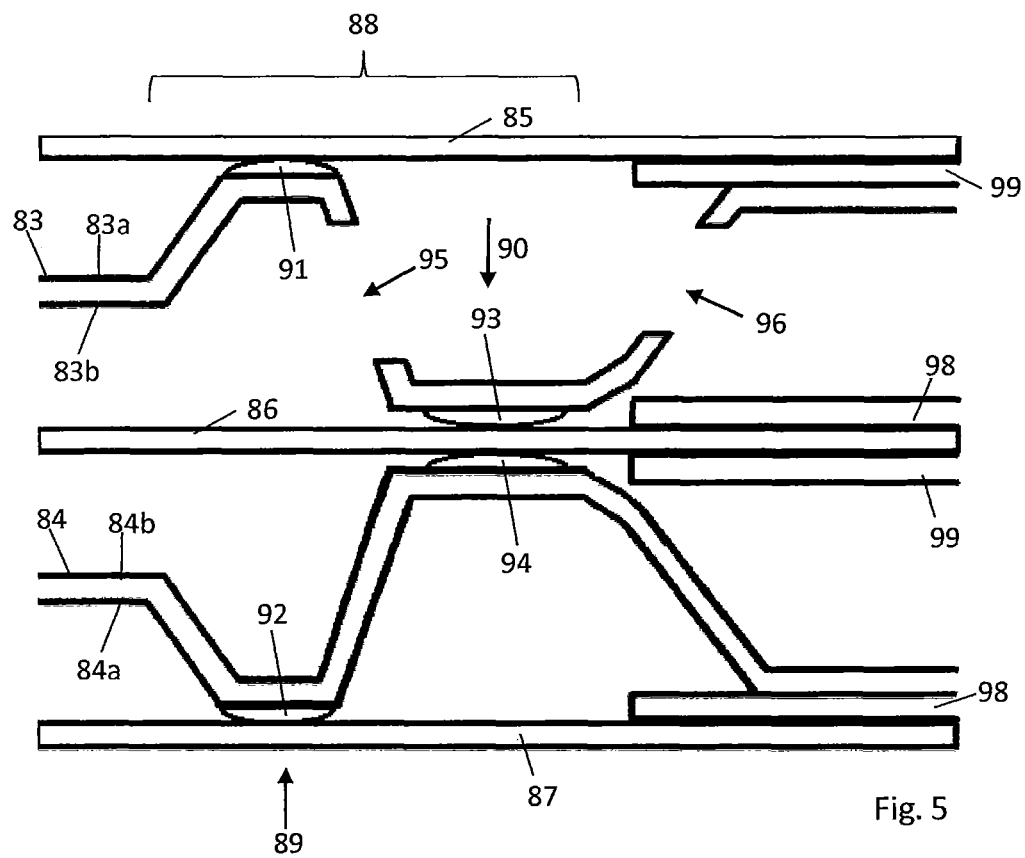
FIG. 5 a sectioned representation through a section of a humidifier according to a further embodiment of the invention.

FIG. 5 shows a sectioned view of a section in the inside of the humidifier 1 according to a further embodiment. In particular, adjacent flow plates 83, 84 are represented, wherein the flow plates 83, 84 are again each formed from precisely one layer of a metal sheet. Furthermore, water exchange membranes 85-87 which are arranged between adjacent flow plates of the humidifier 1 are represented. Moreover, gas diffusion layers 98, 99 are represented in the right part-region of FIG. 5.

The sealing beads of the flow plates 83, 84 which are formed into the metal sheet, in the part region 88 are each formed such that the sealing bead of the flow plate 83 forms a first sealing line on its first flat side 83a at the position 89 and a second sealing line on its second flat side 83b at the position 90. Accordingly, the sealing bead of the flow plate 84 forms a first sealing line on its first flat side 84a at the position 89 and a second sealing line on its second flat side 84b at the position 90. The flow plates 83, 84 differ only in that the flow plate 83 comprises openings 95, 96 in the sealing bead in the part-region 88, in contrast to the flow plate 84.

The flow plates 83, 84 face one another with their second flat sides 83b, 84b and at the position 90 are supported on one another along their second sealing lines which face one another. The water transfer membrane 86 is sealing received, in particular pressed, between the second sealing lines of the flow plates 83, 84 which face one another, at the position 90. The flow plates 83, 84 are each supported on further adjacent plates which are not explicitly represented here, along the first sealing lines of the flow plates 83, 84 at the position 89, wherein the water transfer membranes 85, 87 in turn are sealingly received between the sealing lines of the flow plates 83 and of the adjacent plates which are not explicitly represented here.

The sealing beads which are formed into the metal sheets of the flow plates 83, 84 in the part region 88 further comprise coatings 91-94, for example in the form of an elastomer, along the sealing lines at the positions 89, 90, said coatings improving the sealing behaviour of the sealing beads in the region of the sealing lines, in particular the microsealing.

Figure 6:
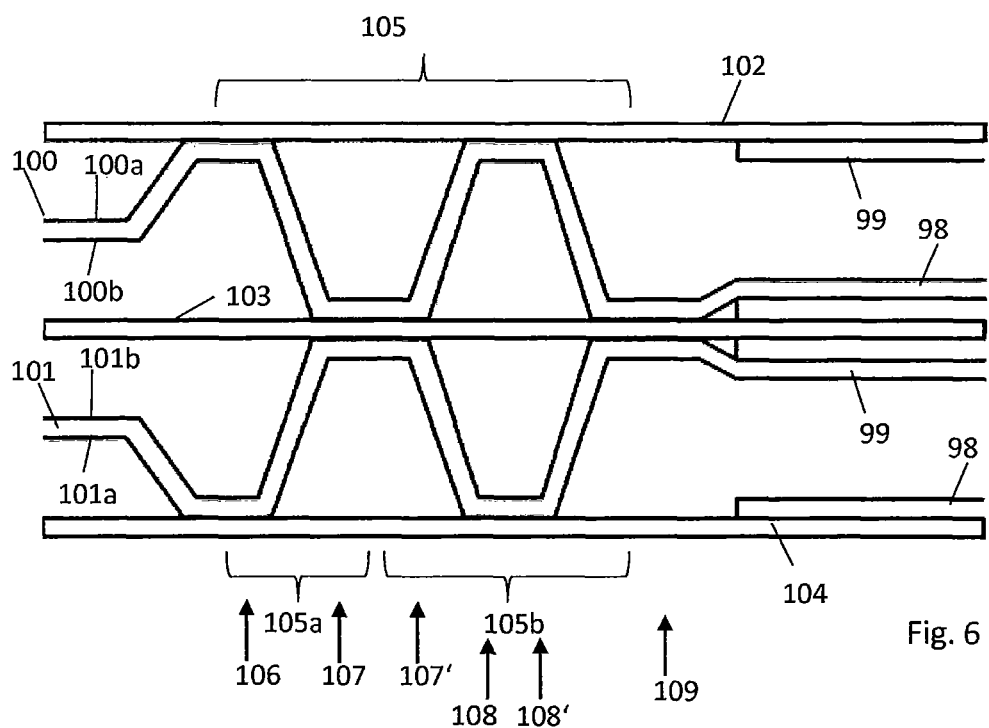
FIG. 6 a sectioned representation through a section of the humidifier according to a further embodiment of the invention.

FIG. 6 shows a sectioned view of a section in the inside of the humidifier 1 according to a further embodiment. In particular, adjacent flow plates 100, 101 are represented, wherein the flow plates again 100, 101 are each formed of precisely one layer of a metal sheet. Furthermore, water exchange membranes 102-104 which are arranged between adjacent flow plates of the humidifier 1 are represented. Moreover, gas diffusion layers 98, 99 are represented in the right part-region of FIG. 6. The sealing beads which are formed into the metal sheets of the flow plates 100, 101 in the part-region 105 each comprise a half-bead 105a and a full bead 105b which connects to the half bead 105a.

Figure 7:
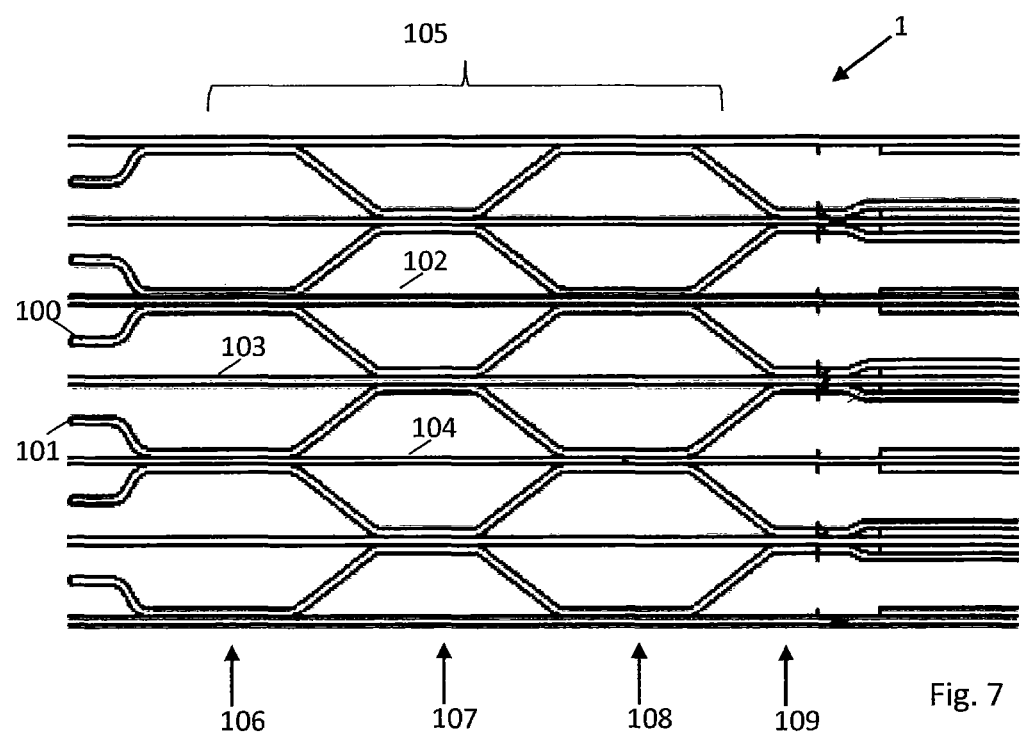
FIG. 7 a further sectioned representation through the humidifier according to FIG. 6.

The flow plates 100, 101 therefore comprise three sealing lines on each of their flat sides 100a, 100b, 101a, 101b. At their first flat sides 100a, 101a which are away from one another, the flow plates 100, 101 comprise sealing lines at the positions 106, 108, 108', and at their second flat sides 100b, 101b which face one another the flow plates 100, 101 comprise sealing lines at the positions 107, 107' 109. The flow plates 101, 101 are supported on one another along their sealing lines which face one another, at the positions 107, 107', 109, amid the pressing of the water transfer membrane 103 between the flow plates 100, 101. Along their sealing lines which are away from one another, the flow plates 100, 101 are supported on adjacent plates which are not shown here at the positions 106, 108, 108' amid the pressing of the water transfer membranes 102, 104. Adjacent plates which are adjacent to the flow plates 100, 101 are represented for example in FIG. 7.

Figure 8:
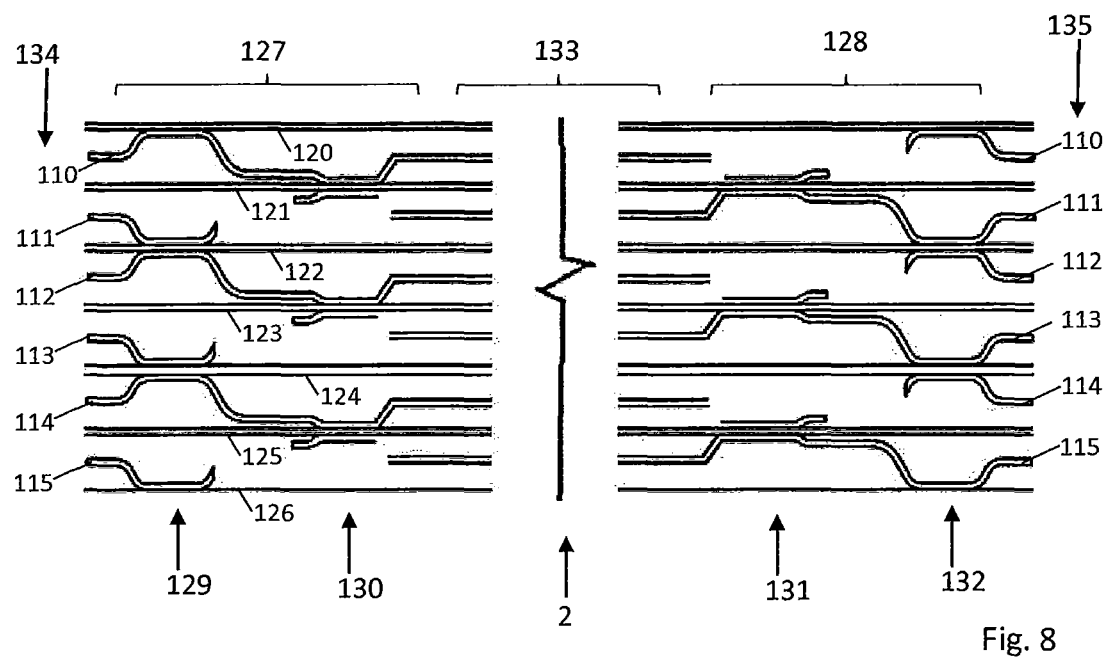
FIG. 8 a sectioned representation through a section of a humidifier according to a further embodiment of the invention.

FIG. 8 shows a sectioned view of a section in the inside of the humidifier 1 according to a further embodiment. In particular, stacked flow plates 110-115 are represented, wherein the flow plates 110-115 are again formed from precisely one position of a metal sheet. Water exchange membranes 120-126 which are arranged between the adjacent flow plates 110-115 and below the flow plates 115 respectively are further represented. The sealing beads in the part regions 127, 128 are each provided with sealing lines at the positions 129-132. For example, flow fields of the flow plates 110-115 are arranged in the part region 133, and specifically preferably on both sides of the flow plates 110-115.

The sealing beads in the part region 127 serve for the sealing of a conduit 134 for guiding dry gas, and the sealing beads in the part region 128 serve for sealing a conduit 135 for guiding humid gas. In the part-region 127, the sealing beads of the flow plates 111, 113, 115 each comprise openings which in the part-region 133 create a fluid connection between the conduit 134 for guiding dry gas and the flow fields of these flow plates. The dry gas therefore flows on both surfaces of the flow plates 111, 113, 115 and herein absorbs humidity via the water exchange membranes 120-126. In contrast, in the part-region 128, the sealing beads of the flow plates 110, 112, 114 each comprise openings, which in the part-region 133 create a fluid connection between the conduit 135 for guiding humid gas and the flow fields of these flow plates. The humid gas therefore flows on both surfaces of the flow plates 110, 112, 114 and herein releases water via the water exchange membranes 120-126. In this manner, the humidifier cells between the water transfer membranes 120-126 are alternately fed with humid and with dry gas in the stack direction 2, so that a humidity exchange can take place via the water transfer membranes 120-126.

Finally, it can be recognised that the flow plates 110-115 in FIG. 8 are all designed in a structurally identical manner, but with regard to their alignment are arranged in an alternating manner. For example, the alignment of each of the flow plates 110, 112, 114 in FIG. 8 can be brought into the alignment of the flow plate 111, 113, 115 which respectively is adjacent to it by way of the flow plates 110, 112, 114 each being rotated by 180 degrees with respect to a symmetry axis of the respective flow plate which is perpendicular to the plane of the drawing. The structurally identical flow plates 110-115 thus again face one another with their first and second flat sides in an alternating manner. The complete construction of the embodiment example which is represented in FIG. 8 is therefore monopolar as that of the previous embodiment examples according to the invention.

Figure 9A:
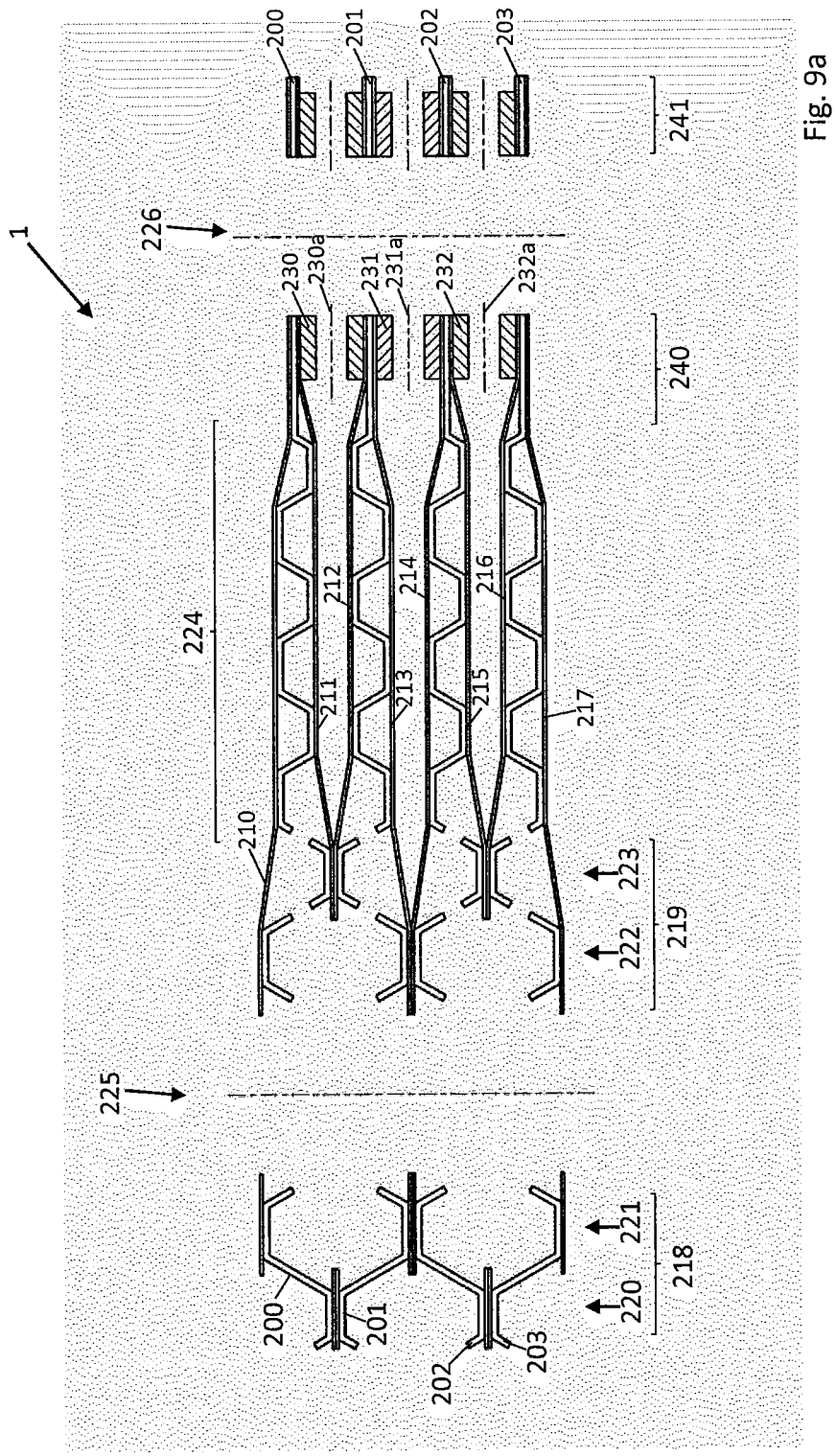
FIG. 9a a sectioned representation through a section of a humidifier according to a further embodiment of the invention.

FIG. 9a shows a sectioned view of a section in the inside of the humidifier 1 according to a further embodiment. In particular, stacked flow plates 200-203 are represented, wherein the flow plates 200-203 are again each formed from exactly one layer of a metal sheet. Water exchange membranes 210-217 which are arranged between adjacent flow plates 200-203 and which each delimit the adjacent humidifier cells of the humidifier 1 from one another are further represented. The sealing beads in the part regions 218, 219 each comprise a sealing line on each side of the metal sheet, specifically at the positions 220, 221, and 222, 223. For example, flow fields of the flow plates 200-203 are arranged in the part region 224, and specifically preferably on both sides of the flow plates 200-203.

A conduit 225 for guiding humid gas and which is formed by through-openings in the flow plates 200-203 is sealed to the flow fields in the part region 224 and with respect to the surroundings of the humidifier 1 by way of the sealing beads in the part-regions 218, 219. Openings in the sealing beads in the part region 219 permit a metered feed of each second gas space with humid gas. These are those gas spaces which are enclosed by the water transfer membranes 210 and 211; 212 and 213; 214 and 215; as well as 216 and 217. The remaining gas spaces are in fluid connection with a conduit 226 for guiding dry gas or gas to be humidified, for feeding dry gas. These are those gas spaces which are enclosed by the water transfer membranes 211 and 212; 213 and 214; as well as 215 and 216.

In particular, the humidifier 1 according to FIG. 9a differs from the previously described embodiment examples in that the flow plates 200-203 and the water transfer membranes 210-217 are stacked in a manner such that exactly two of the water transfer membranes 210-217 are arranged between two adjacent flow plates. In the part regions 218, 219, two of the water transfer membranes 210-217 are therefore sealingly pressed between the sealing lines which face one another, of the sealing beads of adjacent flow plates.

The sealing of the conduit 226 for guiding dry gas with respect to the humidifier cells for receiving humid gas is effected via annular spacers 230-232 which are arranged in the region of the conduit 226 and which sealing press the pairs of water exchange membranes which each enclose a volume for receiving dry gas, i.e. gas to be humidified, onto the adjacent flow plates 200-203. The annular spacers 230-232 each comprise openings 230a-232a which each create a fluid connection between the conduit 226 for guiding dry gas and the volumes for receiving dry gas or gas to be humidified, said volumes being encompassed by the water exchange membranes 210-217.

The conduit 225 for guiding humid gas is in fluid connection with the fuel cell stack 12 via the gas inlet 4. The conduit 226 for guiding dry gas is in fluid connection with the compressor 11 via the gas inlet 5. The volumes for receiving dry gas which are encompassed by the water exchange membranes 210-217 and are in fluid connection with the conduit 226 automatically inflate on operation of the electrochemical system 10 and are therefore pressed onto the adjacent flow plates, on account of the pressure of the dry gas from the compressor 11, said pressure being greater compared to the humid gas.

Figure 9B:
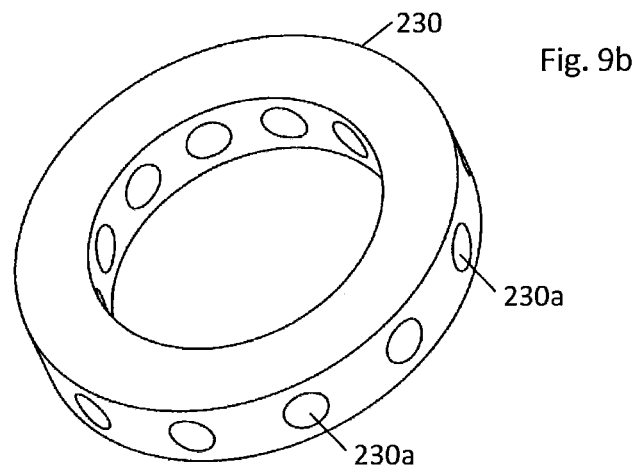
Figure 9C:
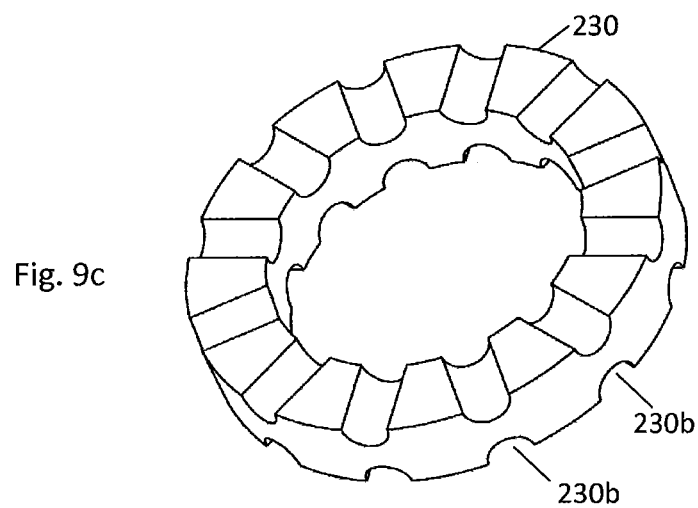
Figure 9D:
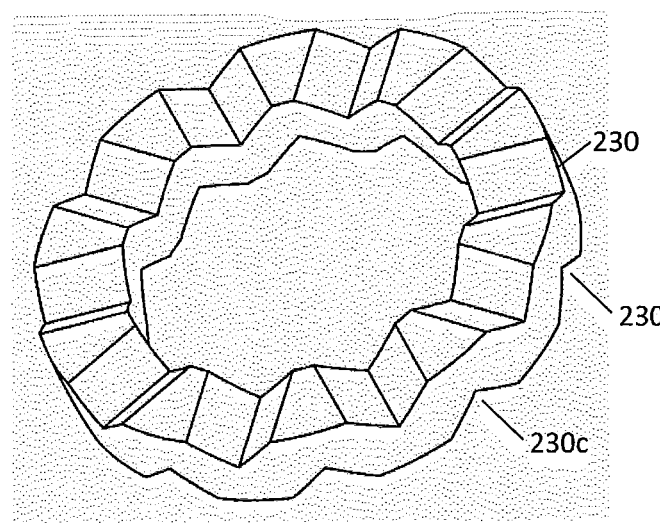

FIGS. 9b, 9c, 9d show different embodiments of the annular spacer 230 of FIG. 9a. Depending on the embodiment, the annular spacer 230 can comprise e.g. openings 230a in the annular surface, rounded recesses 230b or angled recesses 230 on the surfaces of the annular spacer, for creating the fluid connection between the conduit 226 for guiding dry gas and the volumes for receiving dry gas, said volumes being encompassed by the water exchange membranes 210-217.

Figure 10A:
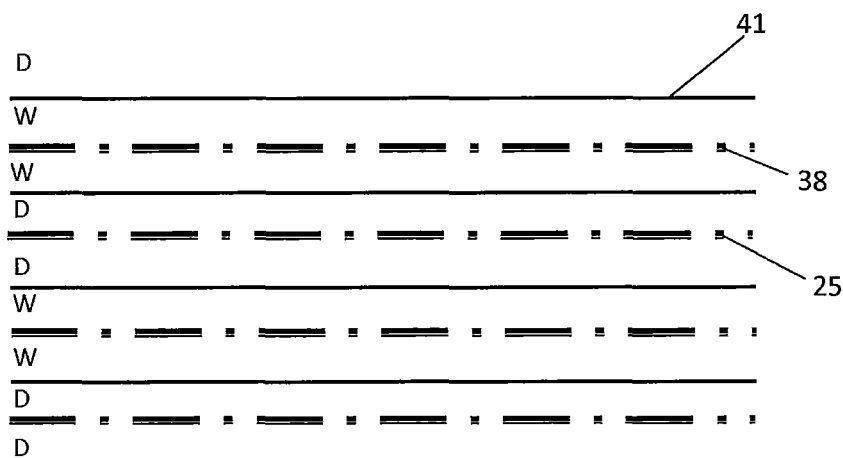
FIGS. 10a-b schematic representations of the monopolar construction of a humidifier according to the invention.
Figure 10B:
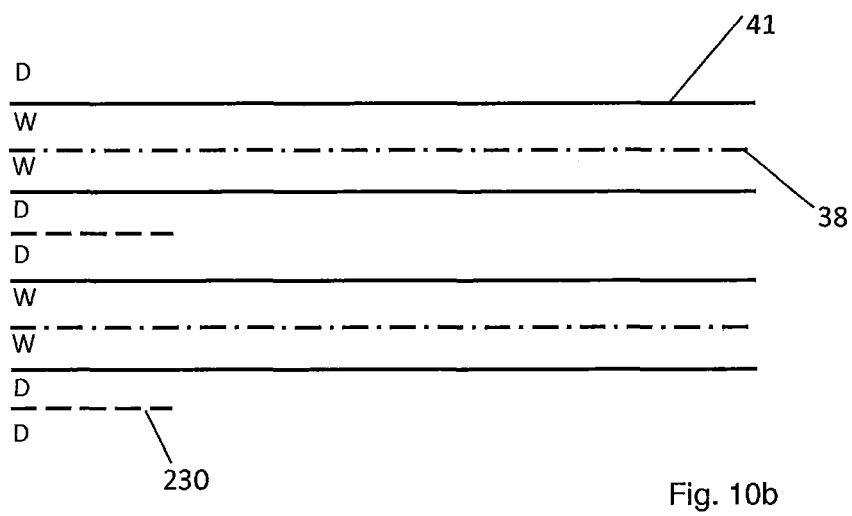

FIGS. 10a and 10b in a greatly schematised representation clearly indicate the monopolar construction of the humidifier according to the invention. Herein, FIG. 10a represents the construction which is shown in FIGS. 3 to 8, each with a single-layered flow plate 25, 38 between two water exchange membranes 41 which are adjacent to one another. Dry gas, thus gas to be humidified ("D") and in the further course humidified gas flows on both sides of the flow plate 25.

Humid gas, thus gas ("W") which releases humidity and, in the further course, gas with a reduced humidity flows on both sides of the flow plate 38. The flow plates can be designed in a structurally identical manner, but built in with a different orientation, which is represented by a mirror-inverted pattern.

FIG. 10 represents the construction of the embodiment example of the figure group 9. This differs from that of FIG. 10a in that only one spacer 230 is present instead of a flow plate 25, said spacer not extending over the whole surface of the remaining construction.

The invention claimed is:

1. A humidifier for humidifying process gas for an electrochemical system or for HVAC applications, which comprises:
    a stack with a multitude of flow plates and with a multitude of water transfer membranes and the flow plates are each formed of precisely one layer of a metal sheet, the flow plates comprising:
        a flow field comprising channel structures; and
        a sealing bead formed integrally with a respective metal sheet, each sealing bead forming a sealing line on one side of the respective metal sheet, the sealing line of the sealing bead of a first flow plate arranged opposite to the sealing line of the sealing bead of a second flow plate adjacent to the first flow plate, and each sealing bead arranged surrounding a respective flow field, through-opening, or flow plate;
    wherein the flow plates and the water transfer membranes are arranged such that at the most one of the single-layered flow plates is arranged between adjacent water transfer membranes of the stack; and
    wherein at least one of the water transfer membranes is sealingly received and pressed between the sealing lines of the sealing bead of the first flow plate and the sealing bead of the second flow plate which face one another.

2. The humidifier according to claim 1, further comprising two end plates, between which the flow plate stack is arranged, with two stack termination plates which are arranged between the end plates and which terminate the stack to the end plates, and with a stack interior which comprises the flow plates which are arranged between the stack termination plates, wherein at least two of the flow plates of the stack interior, wherein each second one of the flow plates of the stack interior are structurally identical to one another, so that the stack interior comprises at the most two types of flow plates of a different construction type.

3. The humidifier according to claim 2, wherein all flow plates of the stack interior are structurally identical to one another.

4. The humidifier according to claim 3, wherein the first and the second flat side of the metal sheets of the structurally identical flow plates of the stack interior are each designed differently and wherein the structurally identical flow plates of the stack interior are arranged and aligned in a manner such that structurally identical flow plates of the stack interior which are adjacent to one another face one another with their first flat sides and with their second flat sides in an alternating manner.

5. The humidifier according to claim 1, wherein the flow plates are each designed in a manner such that the same sealing bead on a first flat side of the metal sheet forms a first sealing line and on a second flat side of the metal sheet forms at least one second sealing line, wherein a perpendicular projection of the first sealing line into a projection plane which is aligned parallel to the planar surface plane of the respective flow plate and a perpendicular projection of the second sealing line into the projection plane run in a manner such that the projection of the first sealing line encompasses the projection of the second sealing line or that the projection of the second sealing line encompasses the projection of the first sealing line, wherein the projections of the first and the second sealing line are distanced to one another in a continuous manner.

6. The humidifier according to claim 5, wherein the flow plates each comprise a symmetry axis with a two-fold symmetry and are designed in a manner such that the first sealing line of the flow plate is sealingly supportable on the first sealing line of a structurally identical first adjacent plate and that the second sealing line is sealingly supportable on the second sealing line of a structurally identical second adjacent plate.

7. The humidifier according to claim 6, wherein the flow plates each comprise a rectangular shape, by way of which two diagonals of the flow plate are defined, wherein the diagonals of the same flow plate intersect one another at an intersection point and wherein the symmetry axis of the respective flow plate runs through the intersection point.

8. The humidifier according to claim 7, wherein the flow plates are each designed in a manner such that the symmetry axis is aligned perpendicularly to the planar surface plane of the flow plate.

9. The humidifier according to claim 8, wherein the flow plates are each designed in a manner such that the symmetry axis and/or that a further symmetry axis of the flow plate with a two-fold symmetry is aligned parallel to the planar surface plane of this flow plate.

10. The humidifier according to claim 1, wherein the flow plates each comprise a flow field for guiding a gas on at least one of the flat sides of the metal sheet, wherein the flow field comprises channel structures for guiding the gas which are designed as one piece with the metal sheet and which are formed into the metal sheet.

11. The humidifier according to claim 10, wherein the flow plates each comprise flow fields on both flat sides of the metal sheet, wherein the metal sheet in the region of the flow fields comprises through-openings which create a fluid connection between the flow fields on the flat sides of the metal sheet which lie opposite one another.

12. The humidifier according to claim 11, wherein the flow plates are each designed in a manner such that the flow field and/or the flow fields is/are each encompassed by the sealing bead or by one of the sealing beads, for sealing off the flow fields and for sealing off the flow field respectively.

13. The humidifier according to claim 12, wherein the flow plates are each designed in a manner such that the metal sheet comprises through-openings for guiding a gas through the metal sheet, wherein the through-openings are encompassed by the sealing bead or by one of the sealing beads, for sealing the through-openings.

14. The humidifier according to claim 13, wherein the flow plates are each designed in a manner such that the sealing bead which encompasses the through openings and/or the sealing bead which encompasses the flow field comprise openings, wherein the openings create a fluid connection between the through-openings and the flow field.

15. The humidifier according to claim 14, wherein the flow plates are each designed in a manner such that the sealing beads which encompass the through-openings, on a side facing away from the respective through-opening comprise supports which extend from the sealing bead for supporting a water transfer membrane or a supporting medium.

16. The humidifier according to claim 1, wherein the flow plates are each designed in a manner such that the sealing bead or the sealing beads comprises or comprise a bead roof and two bead feet which are formed on both sides of the bead roof, wherein the two bead feet form two first sealing lines on the first flat side of the metal sheet and wherein the bead roof forms the at least one second sealing line on the second flat side of the metal sheet.

17. The humidifier according to claim 1, wherein the flow plates are each designed such that the sheet metal is formed from stainless steel.

18. The humidifier according to claim 1, wherein the flow plates are each designed in a manner such that a sheet thickness of the metal sheet is at the most 200 µm.

19. The humidifier according to claim 1, wherein the flow plates are designed and arranged in a manner such that a through-opening of the flow plates of the stack are arranged in an aligned manner and form conduits which extend through the stack in the stack direction for guiding gas to be humidified, gas to be dehumidified, humidified gas and dehumidified gas, wherein the conduits are each in fluid connection with a gas connection.

20. The humidifier according to claim 19, wherein two water transfer membranes are arranged between two adjacent flow plates of the stack, said membranes between them each enclosing a volume for receiving a gas to be humidified and/or a humidified gas, wherein the volume is in fluid connection with the conduit for guiding gas to be humidified and with the conduit for guiding humidified gas.

21. The humidifier according to claim 1, wherein the sealing beads of the flow plates each comprise a continuous coating along at least one of the sealing lines which are formed by them.

22. A humidifier comprising:
a stack with a plurality of flow plates and with a plurality of water transfer membranes;
the flow plates are each formed of one layer of a metal sheet, the flow plates comprising:
a flow field comprising channel structures; and
a sealing bead formed integrally with a respective metal sheet and each sealing bead forms at least one sealing line on one side of the respective metal sheet, the sealing line of the sealing bead of a first flow plate arranged opposite to the sealing line of the sealing bead of a second flow plate adjacent to the first flow plate, and each sealing bead arranged surrounding a respective flow field, through-opening, or flow plate;
the flow plates and the water transfer membranes arranged such that at the most one of the single-layered flow plates is arranged between adjacent water transfer membranes of the stack;
two of the water transfer membranes sealingly received and pressed between the sealing lines of the sealing bead of the first flow plate and the sealing bead of the second flow plate which face one another, the two water transfer membranes enclosing a volume for receiving a gas to be humidified and/or a humidified gas, wherein the volume is in fluid connection with a conduit for guiding gas to be humidified and with a conduit for guiding humidified gas;
the through-openings of the flow plates arranged to align when the flow plates form the stack and form conduits which extend through the stack in the stack direction for guiding the gas to be humidified, gas to be dehumidified, the humidified gas and dehumidified gas, wherein the conduits are each in fluid connection with a gas connection; and
an annular spacer is arranged in the region of the conduits between the water transfer membranes enclosing the volume, said spacer sealingly pressing the water transfer membranes enclosing the volume onto the adjacent flow plates in the region of the conduits with the annular spacer.

23. The humidifier according to claim 22, wherein the annular spacer comprises recesses and/or openings, which create a fluid connection between the respective conduit and the volume.

\* \* \* \* \*